March 11, 1969     B. G. FIELDS     3,431,627
METHOD OF FORMING A BRAKE BAND
Filed May 2, 1966     Sheet 1 of 2
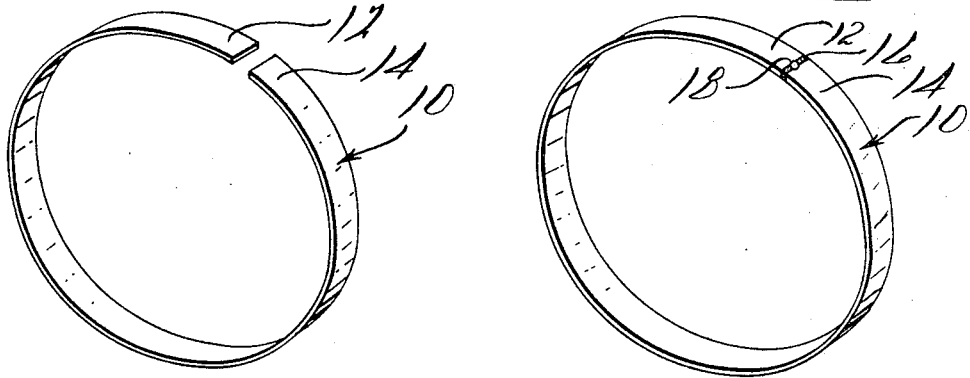
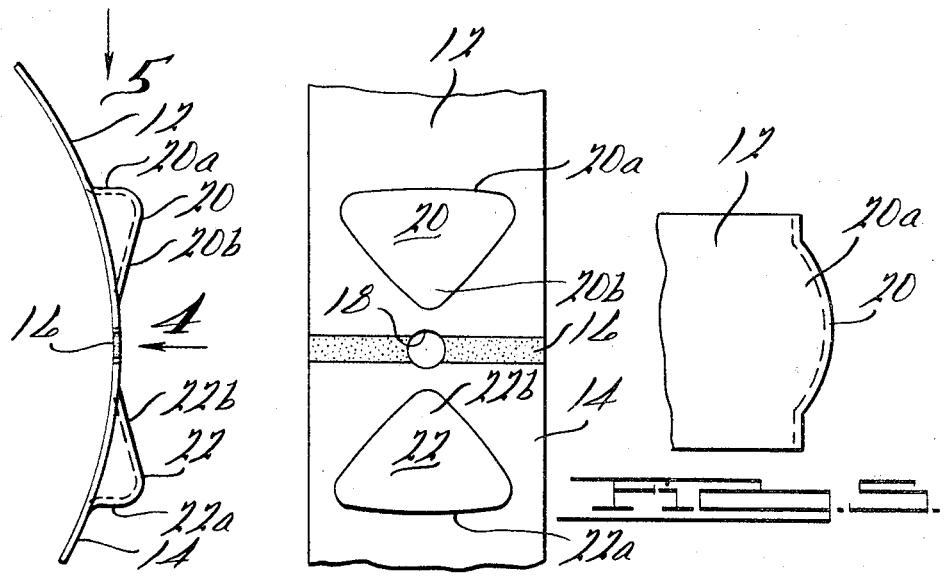
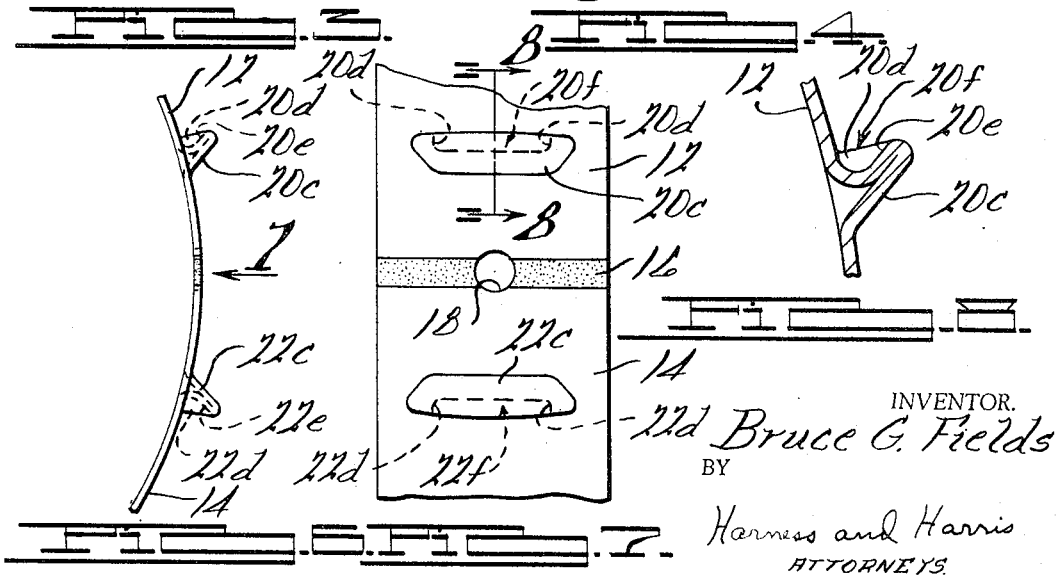
INVENTOR.
*Bruce G. Fields*
BY
*Harness and Harris*
ATTORNEYS.

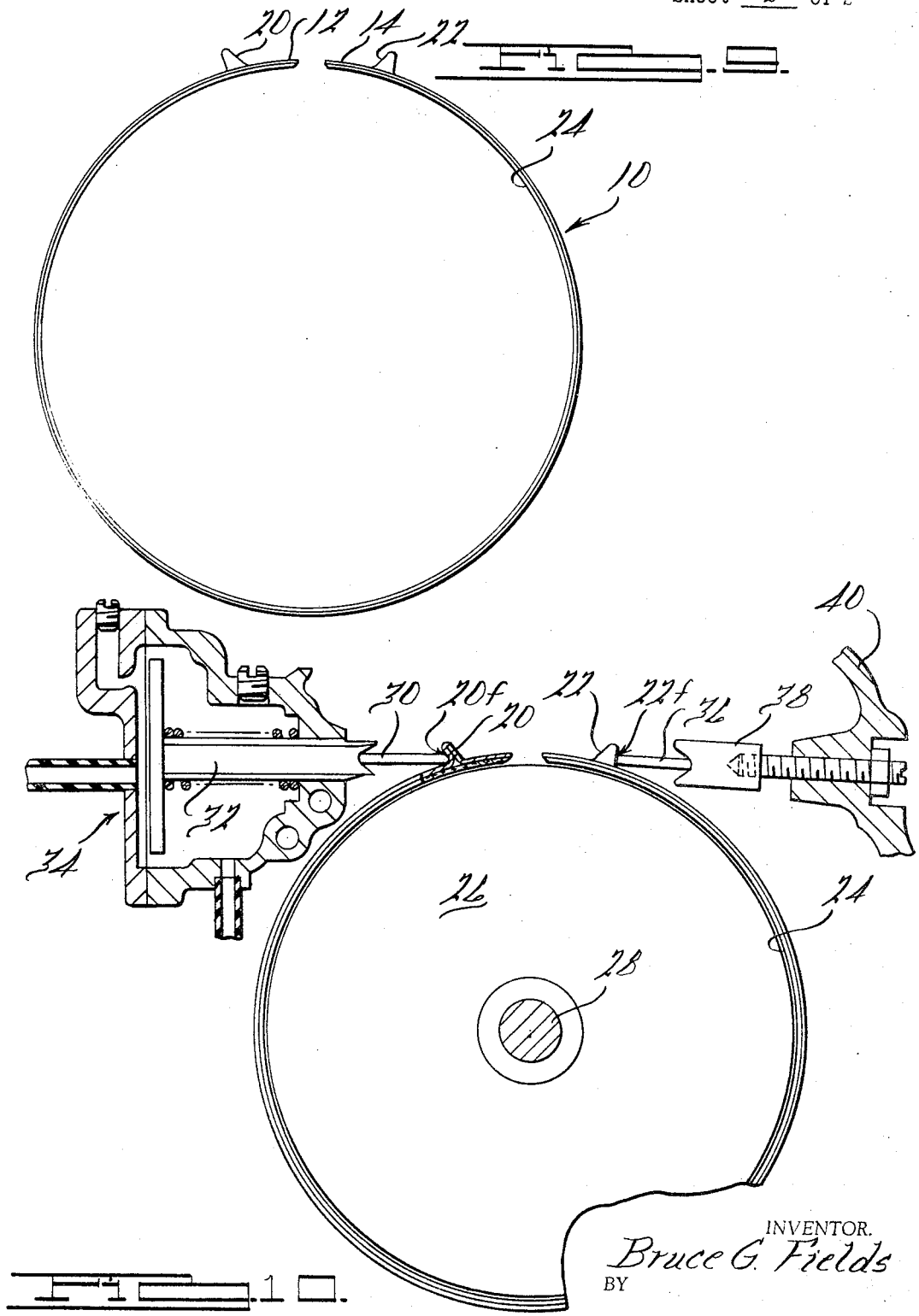

United States Patent Office 3,431,627
Patented Mar. 11, 1969

3,431,627
METHOD OF FORMING A BRAKE BAND
Bruce G. Fields, Kokomo, Ind., assignor to Chrysler Corporation, Highland Park, Mich., a corporation of Delaware
Filed May 2, 1966, Ser. No. 546,801
U.S. Cl. 29—423             8 Claims
Int. Cl. B23p 17/00

ABSTRACT OF THE DISCLOSURE

A method of forming a split circular brake or friction band in which the lugs on each end portion of the band, rather than being formed as separate forged pieces, are provided by ridges formed by the material of the band itself; each ridge is formed by locally deforming the related end portion to form a hollow bulge or bubble raised from the radially outer face of the end portion and thereafter squeezing the circumferentially spaced walls of the bulge together to form a fold of double wall thickness projecting radially outwardly from the end portion.

---

This invention relates to a method of forming a brake or friction band. More specifically, it relates to a method of forming a split brake band of the type designed for selective braking coaction with a rotating drum.

In a brake band of this type, the band normally loosely encircles the drum to allow the latter to rotate freely within the band; when it is desired to slow or stop the rotation of the drum, the band is contracted to frictionally engage the drum and apply a braking force to it. Contraction of the drum is acomcplished by actuator means which engage lugs on the spaced apart free ends of the band and move these lugs together to close up the gap between the free ends of the band.

The actuating means typically comprises an axial piston fluid pressure motor. The free end of the piston rod of the motor, or the free end of a finger or link forming an extension of the piston rod, is received in a pocket formed in one of the lugs; the other lug has a pocket receiving the free end of a fixed finger or link so that actuation of the motor will push the lugs toward each other and close up the band.

According to present practice, the lugs on the free ends of the band are formed as separately forged pieces, whereafter pockets are machined in the forged lugs and the pocketed lugs are secured to the free end portions of the band by welding. This process of forging, machining and welding is expensive and time consuming. It is also objectionable since the weld may fail causing the lug to break loose from the band and rendering the actuating means completely inoperative.

Accordingly, it is an object of the present invention to provide an improved method of forming a brake band.

A further object is to provide a less expensive method of forming a brake band.

Another object is to provide a faster method of forming a brake band.

Yet another object is to provide a method of forming a brake band which will result in a band having improved strength characteristics.

According to the invention, the lugs on each end portion of the band are provided by ridges formed from the material of the band itself. More specifically, the lugs are formed as a generally transverse fold or tuck taken in each end portion of the band. In the disclosed embodiment of the invention, each such fold is formed by locally deforming each end portion to form a hollow bulge or "bubble" raised from the radially outer face of the respective end portion and thereafter squeezing together the circumferentially spaced walls of each bulge to form a ridge or fold of double wall thickness projecting radially outwardly from the respective end portion.

According to a further feature of the invention, each such fold is formed so as to slope away from the tip of the related end portion, whereby each fold coacts with the adjacent underlying portion of the band to form an angular pocket for receipt of the free end of the piston rod or finger of the actuating means.

These and other objects, features, and advantages of the invention will be apparent from the following detailed description of a preferred embodiment of the invention and from the accompanying drawings wherein:

FIGURES 1–10 illustrate successive steps in the formation of a brake band according to the process of the invention.

According to the invention, a flat strip of suitable brake band material is first rolled into a generally circular loop 10. With loop 10 in its relaxed condition, end portions 12 and 14 of the loop are spaced apart. This spacing of end portions 12 and 14 is seen in FIG. 1.

End portions 12 and 14 are thereafter brought together and butt welded, as seen at 16 in FIG. 2. A small locating hole 18 is then made in the center of weld 16 centrally of the side edges of loop 10.

End portions 12 and 14 are thereafter locally heated to a temperature of 1500–1575 degrees Fahrenheit.

The heated end portions are thereafter deformed in an extrusion process to form a hollow bulge or "bubble" 20, 22 on each of the end portions. As seen in FIGS. 3–5, each bulge 20, 22 is raised from the radially outer face of the respective end portion and opens at the radially inner face of that end portion. As seen in FIG. 4, each bulge is generally triangular when viewed in the direction of the arrow 4 and, as seen in FIG. 5, is generally dome shaped when viewed in the direction of arrow 5.

Following formation of bulges 20, 22, end portions 12 and 14 are again heated, this time to a temperature of 1525–1600 degrees Fahrenheit.

Thereafter, suitable indenting and forming dies engage the circumferentially spaced walls 20a, 20b and 22a, 22b of bulges 20, 22 and squeeze them together. The configuration of the bulge material following this indenting and forming operation is seen in FIGS. 6–8.

The material formerly comprising each bulge has now been shaped to form a fold or tuck 20c, 22c projecting upwardly from the radially outer face of the related end portion to define a transverse ridge on that end portion. The indenting dies engaging the walls 20a, 22a have a width less than that of the bulges 20, 22 so as to leave longitudinally extending side walls 20d, 22d flanking each transversely extending fold 20c, 22c. The indenting dies are also shaped to impart a slope to folds 20c, 22c so that the transverse face 20e, 22e of each fold or ridge remote from the tip of the related end portion slopes outwardly away from that tip. Each transverse face 20c, 22c thus coacts with the adjacent underlying portion of the strip, and with the related longitudinal walls 20d, 22d, to form an angular pocket 20f, 22f.

Following the indenting and forming operation, the band is again heated in the area of end portions 12, 14 to a temperature of 1550–1600 degrees Fahrenheit, whereafter it is quenched in Number 6410 oil at 110–150 degrees Fahrenheit and then washed to remove the quench oil. The band then undergoes a stress relieving operation in which it is held at 1050 degrees Fahrenheit for thirty minutes, following which the sides of the band are ground to the desired band width. The band is then expanded to the desired internal diameter, whereafter the inner periphery is shot peened.

A brake lining 24 (FIG. 9) is then bonded to the inner periphery of the band, whereafter the band is parted by sawing a slot through butt weld 16 and locating hole 18. The slot is of sufficient width to completely eliminate weld 16 and hole 18. The free end edges of the brake lining 24 are then chamfered to complete the formation of the brake band assembly. The completed brake band assembly is seen in FIG. 9.

A typical application for the brake band is shown in FIG. 10. Here, the band is seen loosely encircling a drum 26 driven by a shaft 28. Drum 26 may, for example, comprise a clutch drum forming a part of an automatic transmission for a motor vehicle. The free end of a link or finger 30 forming an extension of the piston rod 32 of an axial piston fluid pressure motor 34 is received in pocket 20f. The other pocket 22f receives one end of a finger or link 36. The other end of link 36 is received in a notched block 38 fixedly secured to the transmission housing 40. It will be seen that actuation of motor 34 will close up the brake band to apply a frictional braking force to drum 26.

While a preferred embodiment of the invention has been illustrated and described in detail, it is to be understood that various changes may be made in the disclosed embodiment without departing from the scope or spirit of the invention as defined by the appended claims.

I claim:
1. A process for forming a brake band comprising the steps of
 (A) arranging a strip of brake band material into a generally circular loop; and
 (B) adjacent each end portion of the strip, doubling a portion of the material of the band back upon itself along a transversely extending crease line to form a transverse fold in the band adjacent that end portion.

2. The process of claim 1 wherein the transverse face of each said fold remote from the tip of the related end portion is formed to slope away from that tip, whereby each such remote face coacts with the adjacent, underlying portion of the strip to form a pocket for receipt of a band actuating member.

3. The process of claim 1 wherein step A is performed before step B.

4. The process of claim 1 wherein each of said folds is formed by
 (A) locally deforming each end portion of said strip to form a hollow bulge in each end portion raised from one face of said strip and opening at the other face thereof; and
 (B) squeezing together the circumferentially spaced walls of each said bulge.

5. The process of claim 4 wherein said end portions are heated prior to being locally deformed.

6. The process of claim 4 wherein
 (A) said end portions are butt welded together prior to being deformed and
 (B) said loop is parted generally at the butt weld line after said folds are formed.

7. A process of forming a brake band comprising the steps of:
 (1) arranging a strip of brake band material into a generally circular loop;
 (2) butt welding the free end portions of said loop together;
 (3) heating the butted together end portions of said loop;
 (4) locally deforming each of said end portion to form a hollow bulge in each end portion raised from the radially outer face of that portion and opening at the radially inner face of that portion;
 (5) squeezing together the circumferentially spaced walls of each said bulge to form a transverse fold extending generally radially outwardly from the related end portion; and
 (6) parting said loop generally at the butt weld line.

8. A process according to claim 7 wherein each said fold is formed to slope outwardly away from the tip of the related end portion, whereby each fold coacts with the adjacent underlying portion of the strip to form a pocket for receipt of a band actuating member.

References Cited

UNITED STATES PATENTS

| | | | |
|---|---|---|---|
| 2,080,866 | 5/1937 | Lobdell | 29—159.1 |
| 2,697,274 | 12/1954 | Merrill | 29—414 |
| 3,255,518 | 6/1966 | Golata | 29—159.1 |

THOMAS H. EAGER, *Primary Examiner.*

U.S. Cl. X.R.

29—407, 414, 416